Sept. 25, 1951 L. W. BAILEY 2,569,366
RAPID SERVICE MEANS
Filed July 10, 1948 2 Sheets-Sheet 1
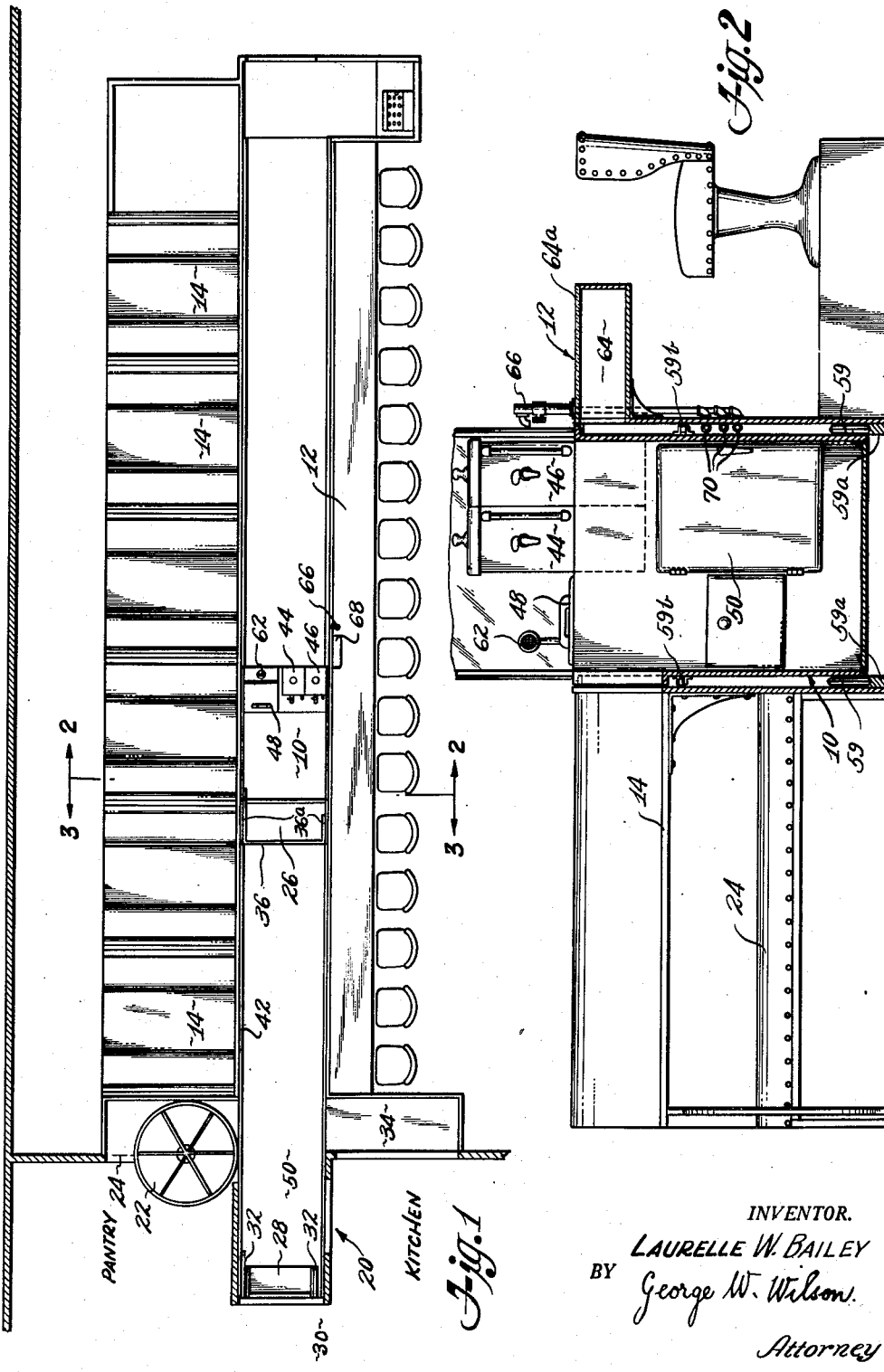
INVENTOR.
LAURELLE W. BAILEY
BY George W. Wilson.
Attorney Sept. 25, 1951          L. W. BAILEY          2,569,366
RAPID SERVICE MEANS
Filed July 10, 1948          2 Sheets—Sheet 2
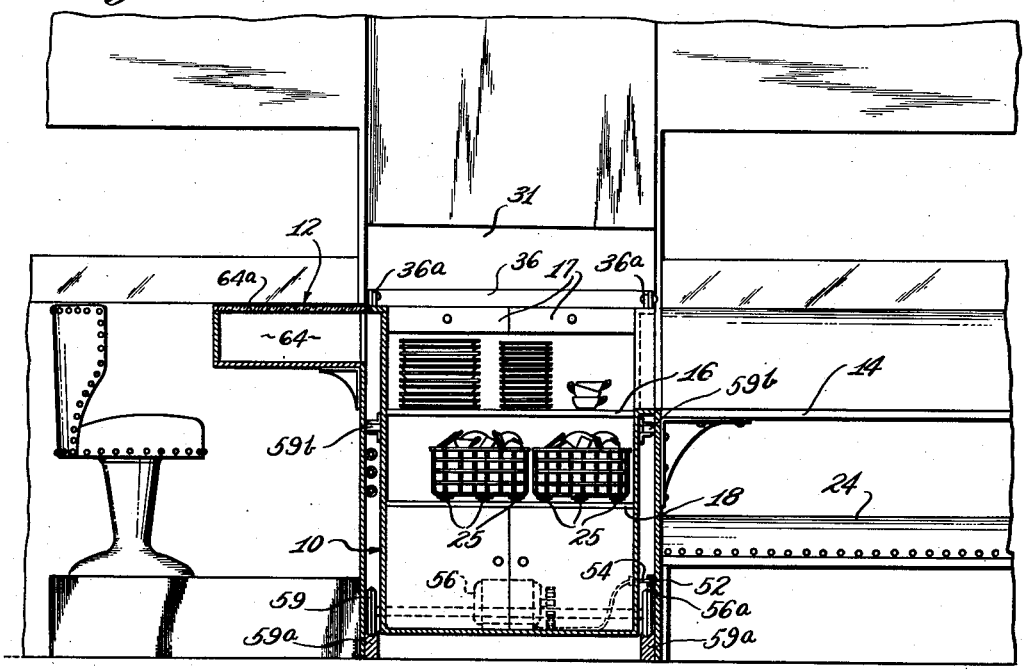
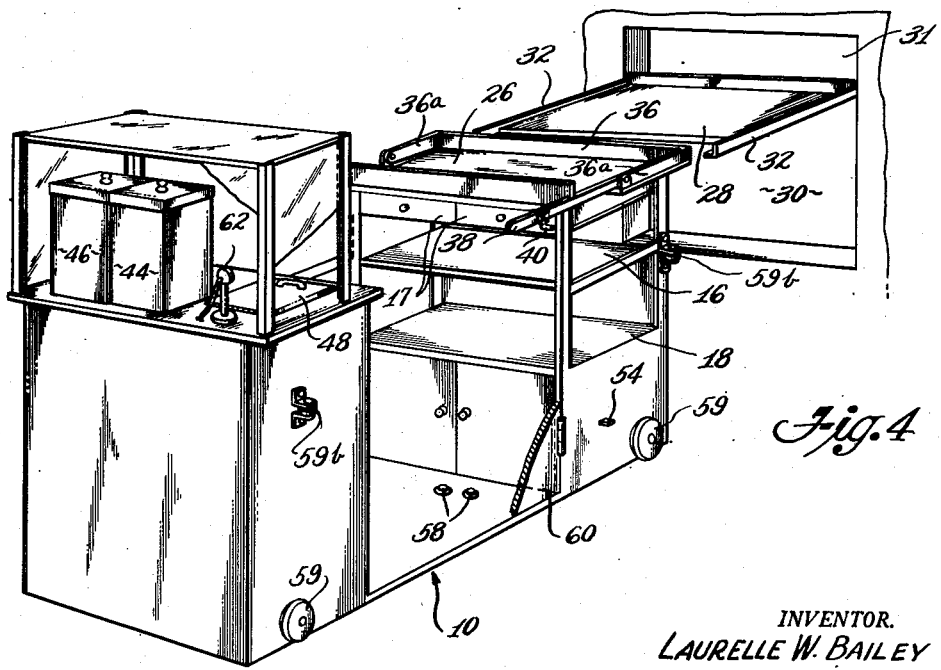
INVENTOR.
LAURELLE W. BAILEY
BY George W. Wilson.
Attorney Patented Sept. 25, 1951

2,569,366

UNITED STATES PATENT OFFICE 2,569,366

RAPID SERVICE MEANS

Laurelle W. Bailey, Los Angeles, Calif.

Application July 10, 1948, Serial No. 38,149

2 Claims. (Cl. 186—1)

My invention relates to the provision of means to improve the service of parts or dishes to persons at definitely located positions such as diners in restaurants, hospitals, factories etc., or persons to whom articles have to be supplied as may be required, and from whom articles have to be removed and requiring personal attention for such service; it will be understood therefore that the invention has a wide field of application, as for instance for use in assembly lines for electronic apparatus, and is illustrated herein with reference to the provision of rapid service in a restaurant or eating place by way of illustrative example only since similar conditions are present in numerous other fields.

In serving meals rapidly the waitress has to keep the tables or places laid with clean linen and silverware, take orders and transmit them to the kitchen for cooked dishes, supply other staple comestibles such as hot and cold drinks and pies, doughnuts and the like from sources of supply other than the kitchen, and remove used dishes. However quickly the waitress may work a great deal of time is lost in going to and from the kitchen service window, going to and from the urns for hot drinks and the like, while the collection of used dishes, even when they are placed below the counter by the waitress necessitates constant trips by bus boys to collect the dishes which interferes with the movements of the waitress and is unpleasant for the diners.

Many attempts have been made to increase the rapidity of service in restaurants, for instance by allowing customers to help themselves while filing past counters laden with the food which not only takes time to accumulate the component dishes for a meal and results in the hot food becoming cooled but involves much walking about carrying loaded trays while getting price tickets, finding vacant tables and the like which in effect imposes on the patrons much of the labor which should be done by the service personnel and still necessitates a large staff to supply the shelves of food, dispense beverages, clear tables and return used dishes to the pantry.

Other systems have provided tables moving before the patrons from which they selected dishes, such a procedure would however be distasteful to many, waste much space and still makes it necessary to move among the patrons to collect used dishes, further such systems necessitate elaborate mechanical installations which are expensive to set up and maintain.

It is an object of my invention to provide a means whereby a number of patrons may be waited on by personnel stationed on a mobile service unit moving in a path between the places of the patrons, serving many items directly from the service unit, setting out clean silver-ware and dishes, clearing away used dishes and transporting a large number of said dishes at a time to a collecting station away from the places served, receiving cooked orders from the kitchen and supplies of fresh linen, china and the like and transporting them on the mobile service unit to the places at which the patrons are located.

It is a further object of my invention to provide mechanical aids to the distribution of articles and collection of the same which obviates a large amount of waste motion with its attendant result of inferior service and unnecessary overhead costs with a minimum of mechanism and that of the simplest kind so that expense of installation and maintenance is low.

Yet another object of my invention is to relieve service personnel of much muscular exertion which may be better performed by mechanical means while retaining for such service personnel such operations as require personal attention to relieve the persons served of the necessity of waiting on themselves.

Yet another object of the invention is to provide means for transporting articles requiring to be taken to various stations for use, which articles may vary widely in character, and collecting articles from said stations, without the use of conveyor belts with their attendant disadvantage of cost of installation and maintenance.

A further object of my invention is to provide means to utilize mechanisms and aids to facilitate the supply of articles of various character some of which articles may be stored adjacent stations at which they are required while others require to be delivered on request from points distant from said stations and therefore require the assistance of personnel, such means being devised to facilitate and relieve the personnel of fatigue and disability caused by prolonged standing, walking and lifting of weights which may be unduly heavy.

Still further objects and features of my invention will hereinafter appear from the following description taken in conjunction with the accompanying drawings which illustrate an embodiment of the invention at present thought preferable by me.

Fig. 1 is a plan view of a restaurant counter having seats along one side and four place booths along the other side, service being provided by a waitress stationed on the mobile service unit of my invention.

Fig. 2 is a cross section on the line 2—2 of Fig. 1.

Fig. 3 is a cross section on the line 3—3 of Fig. 1.

Fig. 4 is a perspective view of the service unit drawn to a larger scale than Fig. 1.

Referring now to the drawings—

The numeral 10 indicates generally a travelling service unit arranged to move between a counter 12 and a series of booths 14, each for four persons. The arrangement illustrated is of course adapted to be duplicated any number of times as may be required by the size of the restaurant. Ordinarily such a grouping of diners would require one waitress to serve the counter while another served the tables, both waitresses would be continually moving back to the kitchen service window to transmit their customers' orders and carry back cooked dishes previously ordered while bus boys at intervals would have to collect used dishes, table linen and silverware generally placed under the counter by the counter waitress and on a service table by the table waitress. The bus boys would also have to supply both the waitresses with clean plates and silver unless they procured them themselves.

According to my invention the mobile service unit is provided with shelves 16 for carrying clean china and drawers 17 for clean silverware, while shelves 18 are provided for carrying used dishes and are arranged below shelves 16.

At one end of the counter a service section 20 is located which is supplied from the pantry with clean linen, china and silverware placed in easily movable wire trays or as shown on a rotatable stand 22 for linen and silverware on shelves aligning with shelves 16 while used linen, silverware and china is collected by the pantry personnel from a shelf 24 aligning with shelf 18.

The wire trays may be of the type generally used in restaurants for their lightness and ease of cleaning or of course may be of any suitable construction, but preferably are provided with anti-friction rollers or casters 25 so that they may be slid very easily on and off the shelves by the waitress on the mobile unit.

The waitress may use the top surface 26 of the service unit for carrying cooked dishes placed on a flat tray 28 at the kitchen end of the runway. Tray 28 is loaded from the kitchen 30 and transferred by the waitress to the mobile service unit when returning to the service end of the counter for this purpose.

Since the waitress needs to exert only a small effort to slide the trays of used dishes on to the pantry shelves and draw a basket of clean dishes, linen and silverware on to the service unit, no appreciable delay in the serving of food is caused while the ability of the waitress to carry many more dishes on the service unit than she could manually transport greatly increases the speed of service.

I prefer to reduce the work required of the waitress to a minimum and for this reason provide an opening 31 in the kitchen wall which is aligned with the service vehicle. Projecting arms 32 of angle cross section are supported on the side walls of the opening and positioned so that their lower edges lie just above the top shelf 26 when the mobile service unit is run to the end of its travel, and a flat tray 28 is slidably supported in the arms 32, the shelf 26 being loaded with cooked dishes by the kitchen personnel.

Before reaching the end of the runway the waitress can lift off the empty tray on top 26 and place it on a shelf 34.

The shelf is transferred from arms 32 to the top 26 by a transfer bar 36 carried on pivoted arms 36a one of which is extended to form a handle 38. By raising the bar by the handle or by engagement of a latch 40 thereon with any suitable form of track 42 mounted on the wall adjacent the end of the runway the bar 36 is raised to clear the food on loaded tray 28 and dropped behind it so that when the service unit moves away from the kitchen the bar 36 will slide the flat tray on to top 26. The track 42 may be in the form of a length of angle material bolted to the wall by one flange, the other flange serving as the track and the latch 40 may be telescopically mounted so that while hanging full length it will be caught under the track and depressed to raise the bar 36 and is released at a lower level than its normal low position when arms 32 are lowered so that it will ride back on the upper side of the cam track being permitted to do so by its telescopic mounting. After riding off the forward end of the track the latch will drop to extended position and will again catch under the track on the next trip to the kitchen of the mobile unit.

The kitchen staff can pick up the empty flat tray and place it in arms 32 to be again loaded. The shelf 34 can then be used to receive salads and the like which the waitress can transfer to an appropriate shelf on the mobile unit before she returns the mobile service unit to the serving area.

The service unit is so arranged that all foods and beverages not requiring running water may be dispensed therefrom. The numerals 44 and 46 indicate coffee urns, electrically heated, and a refrigerated compartment for frozen desserts such as ice creams is indicated at 48. Compartment 48 may be arranged in any suitable way to carry a variety of flavors of bulk ice cream in compartments at the forward ends of pull out drawers with cardboard containers of ice cream in compartments behind the bulk ice cream.

Another refrigerated compartment 50 may be arranged below the coffee urns to hold milk cartons, fruit juice drinks and the like for the counter.

The service unit may be electrically driven by current supplied by a conductor 52 extending along the inside wall of the counter 12 and supplying electric current through a wiping blade contact 54 to a reversible motor 56 and to the various heating units of the coffee or other hot drink urns carried on the movable service unit.

The conductor 54 is preferably covered by a deformable guard 56a of synthetic rubber or covered by a U-shaped guard or protected by other suitable safety member.

The motor is operated by foot pedals 58 for movement in one direction or the other and automatically arranged brake means may be provided to gently arrest movement of the service unit in a known manner. Preferably the operating pedals would be guarded in any suitable way to avoid inadvertent operation by the waitress.

The motor drives V tired wheels 59 running in a V-grooved track 59a supported on the floor of the runway and is preferably steadied by lateral rollers 59b on the frame of the mobile unit. The layout of eating places or stations shown in the embodiment illustrated is merely typical and designed to show the application of the service vehicle to give faster and better service to customers at both counter and tables or booths, a double counter or a double row of tables in all of which arrangements it is customary to serve the tables from one end so that the waitress would not be called upon to learn any new technique of service and need not leave her post on the mobile service unit. To facilitate reaching over the tables as well as under the counter while preventing any danger of her clothing becoming caught between the sides of the vehicle and the wall of the counter or with the ends of the tables and backs of the partitions between the tables, the space between the serving surfaces may be enclosed by a low gate 60 which may be opened to permit the waitress to enter and leave the service unit while at the kitchen or pantry end of the counter, a space being provided to receive the end of the mobile service unit to enable this to be done.

To enable the waitress to phone her orders to the kitchen a telephone 62 unit may be positioned at any convenient point on the service unit and provided with a cord mounted on a windup drum of any suitable construction, as it is believed such an accessory is commercially known further description is not required.

The counter is preferably somewhat higher than table height in order to facilitate service, as illustrated in Fig. 2, and the counter is carried outward to project over the knees of the diners as usual in counter design. I utilize the space made available by this arrangement to provide accommodation for such comestibles as doughnuts, sandwiches and pies which form a large percentage of the food dispensed at counters. The additional storage space, indicated at 64 in Fig. 2, is preferably arranged by forming the counter over space 64a of transparent material, I am thus able to display such items to advantage.

It will be evident that the waitress may readily extract any of the displayed food and place it on the counter since the side partitions of the service unit leave the rear of the storage space unobstructed.

Intermediate the length of the counter I provide water faucets 66 for supplying drinking water, and a small sink 68 for emptying used tumblers, the piping 70 for the sink and water faucets being carried along the inside wall of the counter to floor level.

Preferably folding seats (not shown) are attached to the inside of the side walls of the mobile unit for the convenience of the operator when service is not required.

The means for operating the mobile service unit may take the form of a pair of constantly rotated threaded shafts extending along the counter wall, one of the shafts being engagable by a split nut clutch mounted on the movable unit to cause it to travel in one direction, and another split nut clutch engagable with the other clutch to cause movement in the opposite direction. Any suitable floor level pedal and link arrangement may be provided to operate the clutches. It will be understood that suitable devices are provided to ensure that the stopping and starting of the unit is gradually effected without shock or jar.

It will be noted that the waitress is provided with almost all articles she is required to handle, within easy reach and is relieved of the usual constant walking from one customer to another and to and from the kitchen and is also relieved of the heavy work of carrying the dishes of cooked food so that one waitress can serve a larger number of customers with less effort than in the usual arrangement of eating places even when they have been designed to expedite service.

The work done by bus boys is also largely reduced and their movement among the waitresses and diners with consequent confusion and danger of collision and breakage of dishes is entirely eliminated.

I claim:

1. In an installation for serving articles and material onto a plurality of patron stations of varying heights, a mobile service unit mounted for movement along and between such stations, said mobile unit having a platform, a support rising from said platform at each end thereof and providing at least one horizontal serving surface thereon, said serving surface corresponding in height to the height of at least one of said patron stations, the supports on the platform being disposed so as to provide a station therebetween wherein a person has room to stand for moving articles and material from the mobile unit onto the respective patron stations.

2. In an installation for serving articles and materials onto a row of tables and onto a counter parallel with and spaced transversely from the row of tables, a unit mounted to move in a path provided between the row of tables and said counter, said movable unit having a platform, a support mounted on and rising from the opposite end parts of said platform, one of said supports having a plurality of horizontal serving surfaces at different vertical levels corresponding to varying levels of said tables and counter, the respective supports being spaced apart so as to provide a station on the platform wherein a person stands to serve articles and material from the movable unit onto the tables and counter.

LAURELLE W. BAILEY.

REFERENCES CITED

The following references are of record in the file of this patent:

UNITED STATES PATENTS

| Number | Name | Date |
|---|---|---|
| 1,450,434 | Doerfler | Apr. 3, 1923 |
| 1,624,267 | Lyndon et al. | Apr. 12, 1927 |
| 1,825,952 | Hall | Oct. 6, 1931 |
| 2,248,960 | Collis | July 15, 1941 |